May 26, 1931.    R. E. JOHNSON    1,807,216
MACHINE FOR SAWING MATERIAL AT VARIOUS ANGLES
Filed March 26, 1930    4 Sheets-Sheet 4
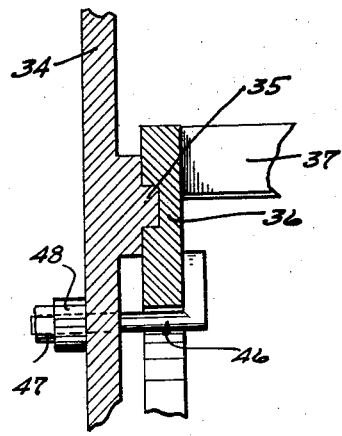
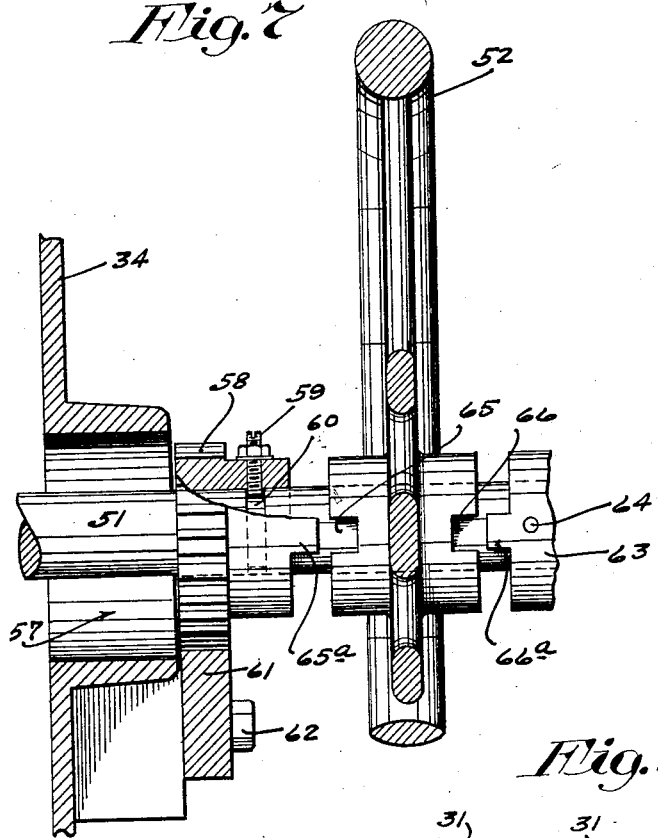
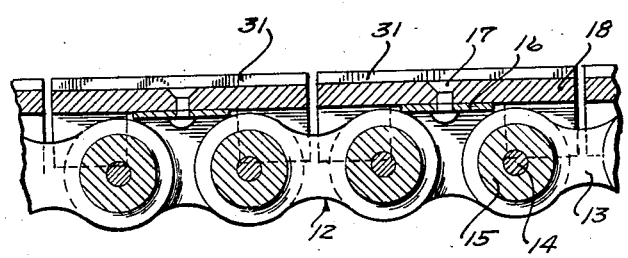
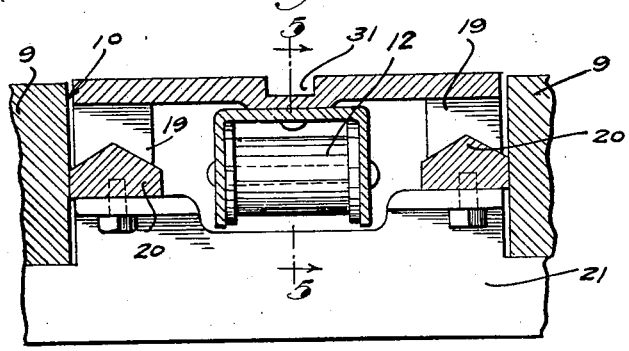
Inventor
Roy E. Johnson
By his Attorneys
Merchant & Kilgore Patented May 26, 1931

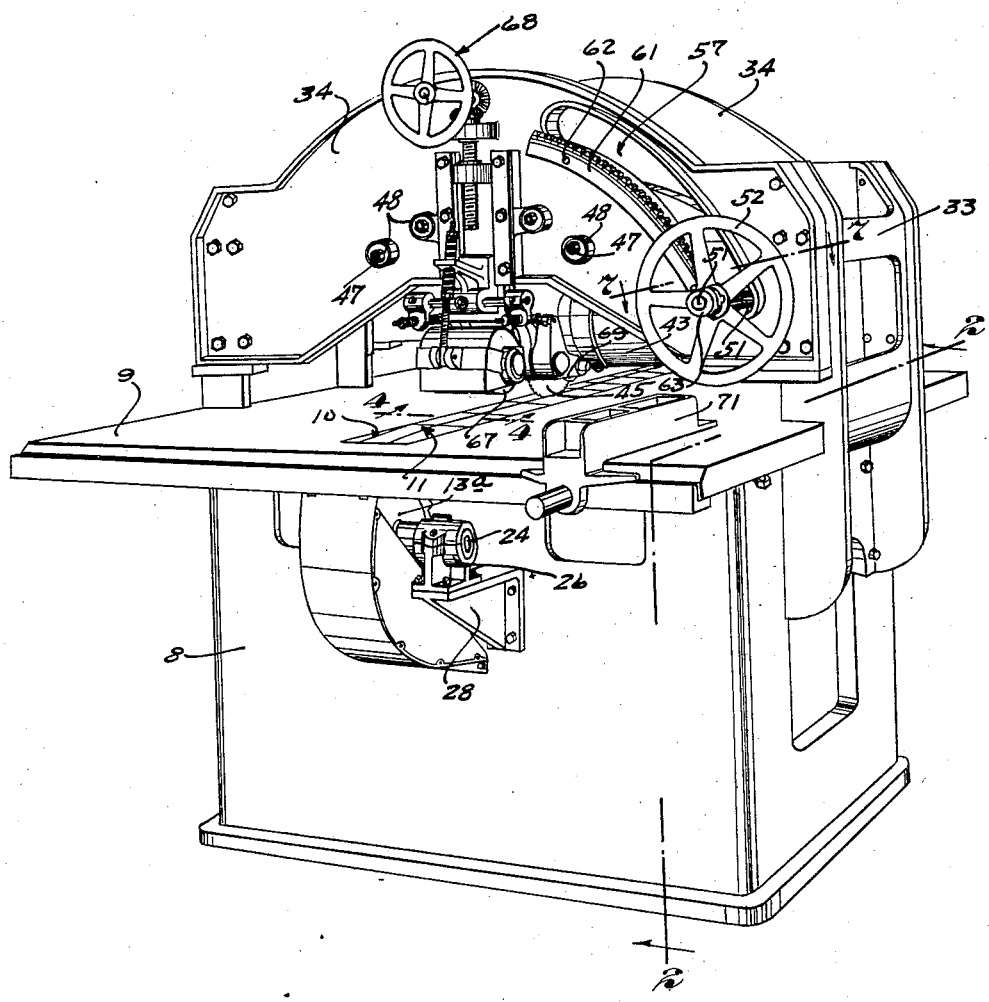

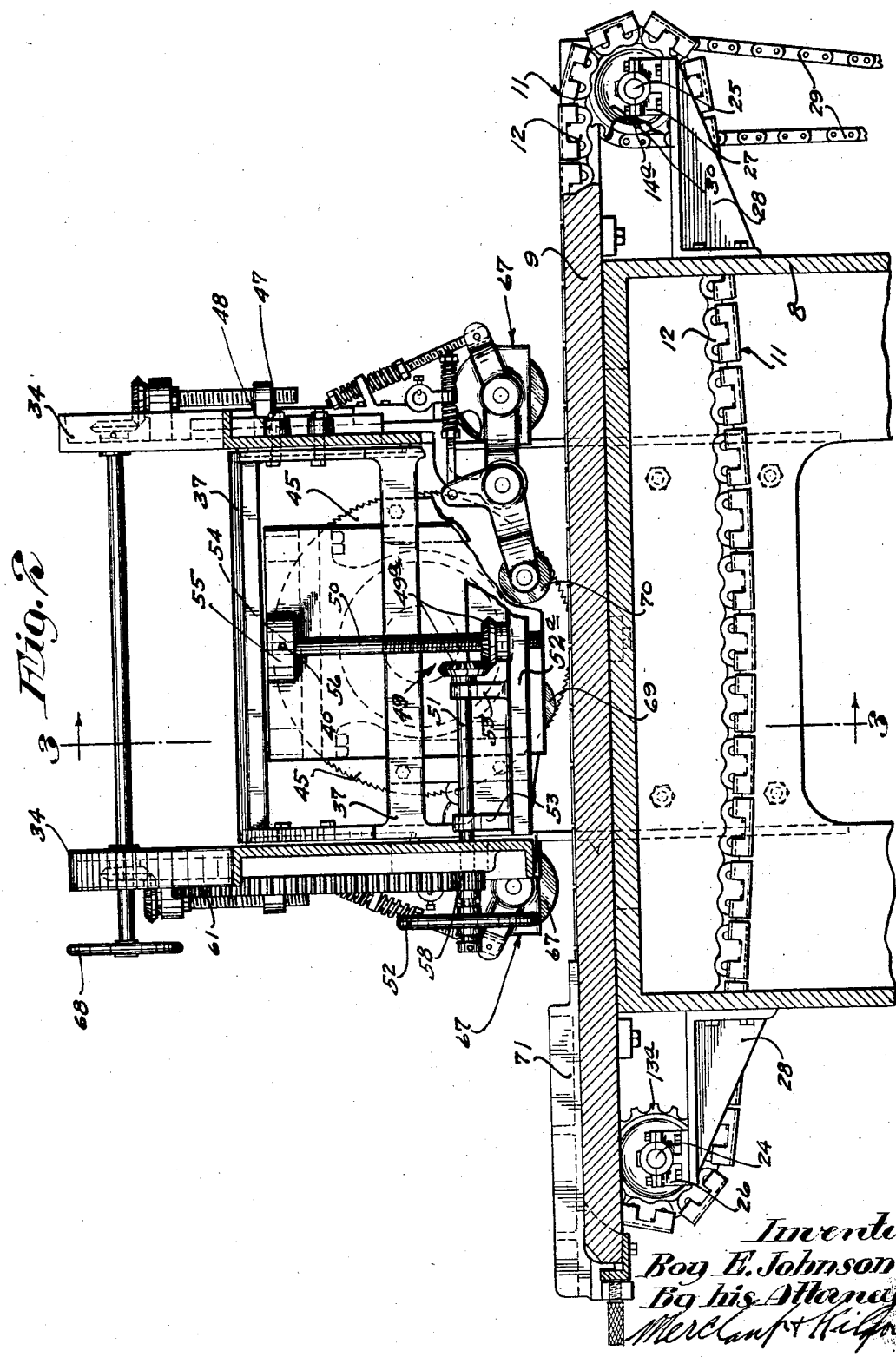

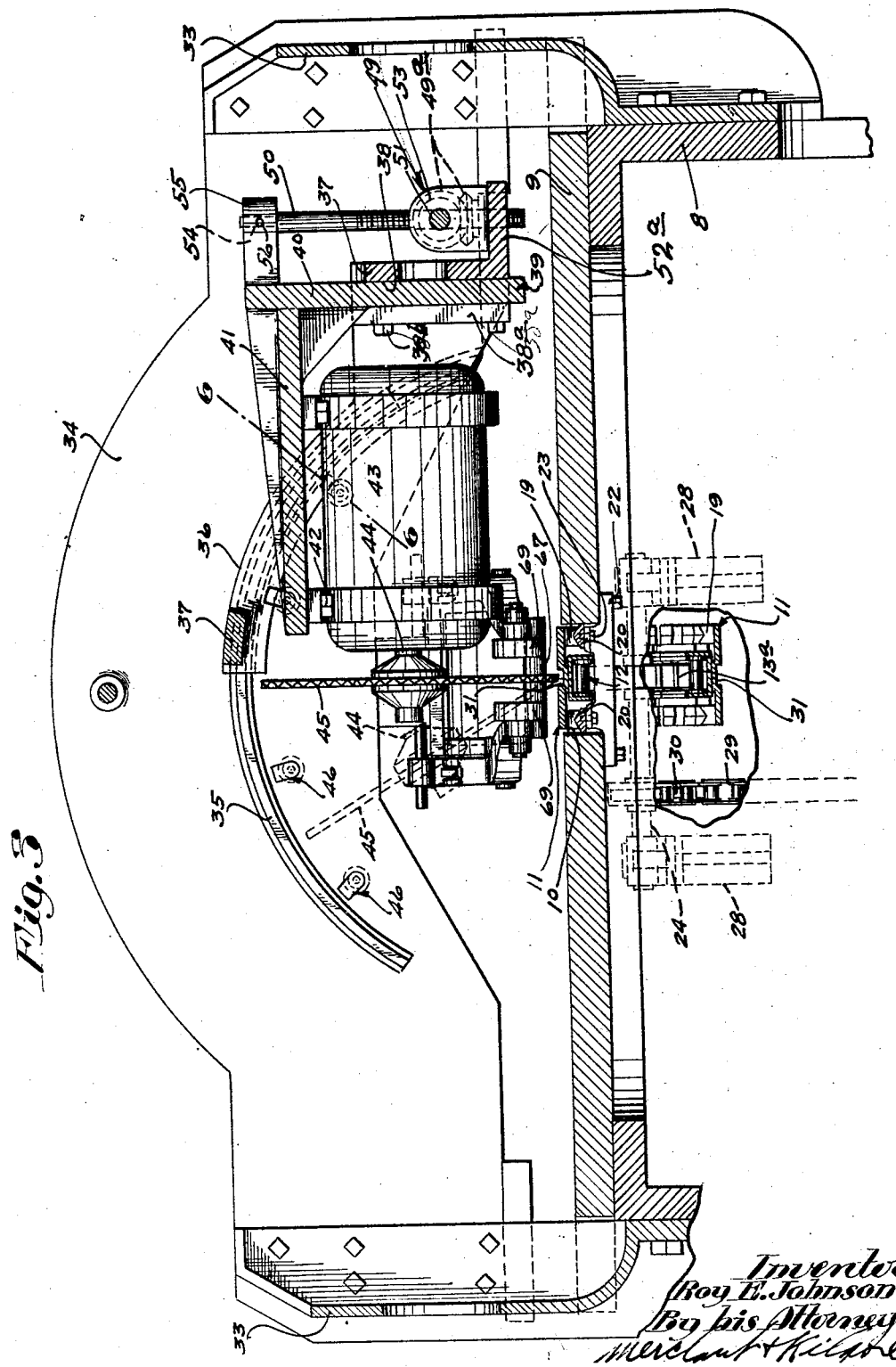

1,807,216

UNITED STATES PATENT OFFICE

ROY E. JOHNSON, OF MINNEAPOLIS, MINNESOTA

MACHINE FOR SAWING MATERIAL AT VARIOUS ANGLES

Application filed March 26, 1930. Serial No. 439,001.

This invention relates particularly to an improved sawing machine of a type employing a circle saw and a conveyor for delivering material thereto and wherein the saw is adjustably tiltable into various angles in respect to the conveyor.

Generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a perspective view of the complete machine;

Fig. 2 is a longitudinal vertical section taken approximately on the line 2—2 of Fig. 1;

Fig. 3 is a transverse vertical section taken approximately on the line 3—3 of Fig. 2;

Fig. 4 is a fragmentary detail sectional view taken approximately on the line 4—4 of Fig. 1, some parts being broken away and some parts being shown in full and is on an enlarged scale;

Fig. 5 is a detail view taken on the line 5—5 of Fig. 4;

Fig. 6 is an enlarged detail view sectioned approximately on the line 6—6 of Fig. 3; and Fig. 7 is an enlarged detail view sectioned approximately on the line 7—7 of Fig. 1, some parts being broken away.

Mounted on and supported by a mounting base 8 is a work table 9, in which work table 9 is a longitudinal slot 10 that is adapted to receive the upper portion of an endless conveyor 11. This endless conveyor 11 comprises a link chain 12 made up of laterally spaced side links 13 connected by trunnions 14 and mounted on which trunnions, between the spaced side links 13, are rollers 15. The intermediate portion of every other pair of laterally spaced chain links 13 are connected by a tie member 16 so that said links appear U-shaped in cross-section, as shown in Fig. 4. Carried by and secured to each pair of connected links 13, by means of a rivet or the like 17, is a work engaging shoe 18. These shoes 18 project considerably beyond the sides of the chain 12 and are provided at their front and rear underside portions with depending slide lugs 19, which lugs are adapted to engage and slide on guide rails 20 that are supported one near each side of the slot 9 by means of supporting brackets 21. The chains 13 run over sprockets 13a and 14a at opposite ends of the machine.

The guide rails 20 lie within the work table slot 10 and extend between the sprockets 13a and 14a. The brackets 21 are secured to the underside of the work table 9 each side of the slot 10 by means of bolts or the like 22 and the said rails 20 are secured to the upper portions of the brackets 21 by bolts or cap screws 23. By means of the guide rails 20 the work engaging faces of the shoes 18 on the upper portion of the conveyor between the sprockets 13a and 14a are held slightly above the top surface of the work table 9. The sprockets 13a and 14a are mounted on and for movements with short shafts 24 and 25, respectively, which shafts are mounted in bearings 26 and 27, respectively. The bearings 26 and 27 are mounted on supporting brackets 28 that project outward from the mounting base 8 beneath the work table 9.

The conveyor 11 may be driven from any suitable source, not shown, through a drive chain 29 and a sprocket 30 mounted on the shaft 25 for movement therewith, which shaft has driving engagement with the conveyor sprocket 14a. Each of the conveyor shoes 18 is provided with a longitudinally extended groove 31 and the groove in each thereof is aligned so as to form a substantially continuous groove around the entire conveyor.

Mounted above the work table 9 and tied together and supported in common from the mounting base 8, by means of brackets 33, is a pair of laterally spaced frame members 34, which frame members 34 extend across the intermediate portion of the work table 9 and the conveyor 11 transversely to said conveyor 11. Formed on or suitably secured to the inner faces of the frame members 34 is a pair of opposed radial guides 35. Slidably mounted on the guides 35 are radial slides 36, which slides 36 are connected by and constitute an integral part of a sliding frame 37.

Vertically slidably mounted on the back portion of the sliding frame 37, in opposed ways 38 in the sliding frame 37, is a motor mounting bracket 39 comprising mainly a substantially vertical back portion 40 and a substantially horizontal top portion 41. Mounted under this substantially horizontal portion 41 of the motor mounting bracket 39, by means of bolts or the like 42, is an electric motor 43 carrying the rotor shaft 44 on which shaft is a circle saw 45 that lies above and is adapted to work in the aligned conveyor shoe grooves 31.

The saw 45 is normally set so that its bottom portion, which works within the conveyor groove 31, is approximately in the plane of the axis of said radial slides, substantially as illustrated in Fig. 3. It will now be apparent that when the radial slides 36 are moved adjustably over the radial guides 35, all of the parts carried by said slides, including the saw 45, will be caused to move about a point within the conveyor groove 31 and as the bottom of said saw 45 is set approximately on this point little or substantially no movement will be imparted to the bottom portion thereof.

By reference to the dotted line position of the saw in Fig. 3, it will be noted that the saw may be turned at considerable angle to the vertical position, shown in full lines, without materially moving its bottom in respect to the conveyor groove 31. The radial slides 36 may be adjustably locked in a desired position by means of L-shaped clamping bolts 46, the feet of which engage the lower inside portion of the radial slides 36 and the heads of which project outward through the frame members 34 and are provided at their outer ends with clamping nuts 47 and washers 48. When the nuts 47 of the L-shaped clamping bolts 46 are loose, sliding frame 39 may be slid in respect to the radial guides 35 to position the saw at a desired angle and when said nuts 47 are tightened the slides will be positively locked against accidental movement thereby maintaining proper adjustment of the saw 45.

The end and outer sides of the ways 38 are formed directly in the sliding frame and the inside portions of said ways are formed by detachable guide rails 38a that are removably secured thereto by means of cap screws or the like 38b and by means of which detachable guide rails 38a the motor mounting bracket 39 may be readily removed from the ways 38. The motor mounting bracket 39 is normally held positioned in the ways 38 and is adapted to have vertical sliding movements imparted thereto by means of a lifting and positioning mechanism 49 comprising a pair of beveled gears 49a, a screw-threaded jack shaft 50, an operating shaft 51, and a hand-wheel 52.

A lower horizontally disposed bevel gear 49a has screw-threaded engagement with the jack shaft 50 and the hub of said gear is seated on a supporting ledge 52a formed as part of and projecting from the lower outside portion of the sliding frame 37 and the vertically disposed miter gear 49a is suitably secured to and for movements with the operating shaft 51, which shaft, at its intermediate and inner portion, is journaled in the bearing lug 53 that projects upward from the ledge 52a.

The lower end portion of the jack shaft 50 projects through the bottom of the ledge 52a and is loose therein for axial sliding movements and the upper end portion of said jack shaft 50 is reduced at 54 and said reduced portion 54 is inserted into an outwardly projecting lifting lug 55 that is formed as part of the vertical back portion of the motor mounting frame 41 and the shoulder formed by reducing the end of the jack shaft 50 at 54 engages the bottom side of the lug 55. This jack shaft 50 is held against rotating movements by means of a pin or the like 56 and against axial movements by means of a pin or the like 56 and against axial movements by said pin 56 and the shoulder formed by the reduction of the jack shaft 50 at 54. The shaft 51, which is movable radially with the sliding frame 37, works through a radial slot 57 in one of the frame brackets 34.

Journaled on the shaft 51 outside of the frame bracket 34 is a pinion gear 58, which gear is held against axial sliding movement by a screw 59. This screw 59 has screw-threaded engagement with the hub of said gear 58 and the inner end portion thereof works in an annular groove 60 in the shaft 51. The pinion gear 58 meshes with a radial rack 61 that is secured to the frame bracket 34 at the front side of the machine just below the radial slot 57. This rack 61 is secured to the frame bracket 34 by means of bolts or the like 62. It is, of course, understood that the axis of the radial slots 57 and radial racks 61 is common with the axis of a segmental slide 35.

The hub of the hand-wheel 52 is rotatively mounted on the shaft 51 and is slidable between the hub of the pinion 58 and a collar 63 on the outer end portion of the shaft 61, which collar 63 is secured to and for movements with the shaft 51 by means of a pin or the like 64. Formed in the opposite end portions of the hub of the hand-wheel 52 are half-clutches 65 and 66, respectively, which half clutches are adapted to cooperate with half clutches 65a and 66a, respectively.

The half-clutch members 65a are formed on and project outward from the hub of the pinion 58 and the half-clutch members 66a project from and are formed as part of the collar 63, see Fig. 7.

It will now be apparent that when the hand-wheel 52 is slid outwardly on the shaft 51 so that the half-clutch portions or notches 66 in the hub thereof engage the half-clutch members 66a carried by the collar 63, said wheel 52 will have driving engagement with the shaft 51. On the other hand, when a hand-wheel 52 is slid inwardly on the shaft 51 so that its half-clutch portions 65 engage the half-clutch members 65a on the hub of the pinion 58, said wheel will have driving engagement with said pinion 58 and, as both thereof are loose on said shaft said pinion may be rotated by and with the hand-wheel 52 without causing rotation of the shaft 51. Obviously, when the wheel 52 is in the intermediate position shown in Fig. 7, it has no driving engagement whatsoever and is in a neutral position. In the manner above described, the hand-wheel 52 is used for two purposes. First, to rotate the shaft 51 and bevel gears 49 to raise and lower the motor mounting frame 37 and parts carried thereby, and second, to rotate the pinion gear 58 which, by its engagement with the radial rack 61, will cause the sliding frame 37 and parts carried thereby to move radially and thus tilt the saw 45 into various positions.

Carried by the outside intermediate portions of the frame brackets 34 are vertically adjustable spring actuated pressure hold down rollers 67, the adjustment mechanism of which is indicated by the numeral 68. These spring actuated pressure hold down rollers 67 are located directly above the endless conveyor 11, one directly ahead and one directly behind the saw 45. Spaced from the opposite sides of the saw 45 and forward of the axis thereof is a pair of spring actuated pressure rollers 69 and on opposite sides of said saw 45, rearward of the axis thereof, is a pair of spring actuated hold down rollers 70. The hold down rollers 67 hold a sheet of material in firm contact with the endless conveyor 11 while being delivered to and from the saw 45 and the spring actuated rollers 69 and 70 hold the material firmly thereon and against upward movement during the cutting operation while passing the saw 45.

By reference, however, to Fig. 3, it will be noted that while the rollers 69 and 70 are spaced sufficiently from the saw 45 to permit considerable angular adjustment of said saw 45 it will in cases where quite an extreme angle is required, as shown by dotted lines in Fig. 3, be necessary to remove the rollers 69 and 70 on the side toward which said saw is being tilted.

In this device saws of different diameters may, if desired, be employed. For example if a small saw is being used the motor and saw may be readily lowered so that the bottom of the saw works in the conveyor groove 31 at the approximate axis of the arc around which the saw is adjustable and, of course, if a larger saw than the one shown is to be used it will simply be necessary to raise the saw and motor, which vertical adjustments are, of course, obtained by manipulation of the hand-wheel 52.

By reference to Fig. 1, it will be noted that the machine is provided with an adjustable work guide 71. This guide 71 is mounted on the front top portion of the table 8 and is slidably adjustable transversely thereon to accommodate materials of various widths.

What I claim is:

1. In a sawing machine, a saw, a conveyor underlying said saw and arranged to deliver material to and past said saw, said conveyor having a longitudinal groove therein and said saw being adapted and arranged so that its cutting edge works in said groove, and said saw being mounted for adjustable movements transversely to the conveyor about a circle having its axis within the conveyor groove so that the saw in all its angular adjustments will have a portion of its cutting edge within the conveyor groove.

2. In a sawing machine, an endless belt conveyor having a longitudinal groove therein, and a saw mounted above said conveyor and arranged so that a portion of its cutting edge works in said conveyor groove, said saw being angularly adjustable transversely of the conveyor about the axis of a circle struck from a point within said conveyor groove so that the saw in all its angular adjustments will have a portion of its cutting edge within the conveyor groove.

3. In a sawing machine, an endless belt conveyor having a longitudinal groove therein, a saw mounted above said conveyor and adapted and arranged so that a portion of its cutting edge works in said groove, said saw being movable about the axis of a circle struck from a point within said conveyor groove, and means for adjustably moving said saw toward and away from said conveyor.

4. In a sawing machine, a work table having a longitudinal slot therein, an endless conveyor working in said slot and projecting slightly above the top of said table, said conveyor having a longitudinal groove therein, laterally spaced frame members extended across the top of said work table transversely to the endless conveyor, opposed arcuate guides carried by said frame members and the axis of said guides being within the conveyor groove, an arcuate slide carried by each of said radial guides, and a circular saw carried by and between said slides above said conveyor, said saw being adapted to work in the conveyor groove, and slidably adjustable with said slides about the axis of the arcuate guides whereby the saw may be tilted into various angles substantially without changing the position of its bottom in respect to the conveyor groove.

In testimony whereof I affix my signature.

ROY E. JOHNSON.